United States Patent [19]

McIntyre

[11] Patent Number: 4,867,854

[45] Date of Patent: Sep. 19, 1989

[54] CONTROLLED FILM BUILD EPOXY COATINGS APPLIED BY CATHODIC ELECTRODEPOSITION

[75] Inventor: John M. McIntyre, Lake Jackson, Tex.

[73] Assignee: The Dow Chemical Company, Midland, Mich.

[21] Appl. No.: 89,656

[22] Filed: Aug. 26, 1987

Related U.S. Application Data

[63] Continuation-in-part of Ser. No. 911,281, Sep. 24, 1986, abandoned.

[51] Int. Cl.$^4$ .................. C25D 13/00; C08K 3/20
[52] U.S. Cl. .................. 204/181.7; 523/403; 524/901; 525/524
[58] Field of Search ............ 204/181.7; 524/901; 525/524; 523/403

[56] References Cited

U.S. PATENT DOCUMENTS

| | | | |
|---|---|---|---|
| 4,315,840 | 2/1982 | Kempter et al. | 204/181.7 X |
| 4,515,911 | 5/1985 | Swider et al. | 523/414 |
| 4,595,716 | 6/1986 | Woo et al. | 523/403 |
| 4,659,800 | 4/1987 | Daimer et al. | 528/103 |
| 4,698,141 | 10/1987 | Anderson et al. | 204/181.7 |

FOREIGN PATENT DOCUMENTS

| | | |
|---|---|---|
| 193102 | 9/1986 | European Pat. Off. . |
| 2726269 | 12/1978 | Fed. Rep. of Germany . |
| WO85/01951 | 5/1985 | PCT Int'l Appl. . |
| 2074578 | 11/1981 | United Kingdom . |

OTHER PUBLICATIONS

CA 81:14798a, Jap. Kokai 73 102, 157, vol. 81, 1974, "Water-Based Epoxy Resin Coating Compositions".

*Primary Examiner*—Stephen J. Kalafut

[57] ABSTRACT

An improvement is described for a process for the preparation of an epoxy cationic resin from an epoxy resin composition having terminal oxirane groups which includes the step of converting oxirane groups to cationic groups by reacting a nucleophile with at least some of the oxirane groups of the epoxy resin composition wherein an organic acid and water are added during some part of this conversion; wherein the improvement resides in using as the epoxy resin composition a blend of (I) at least one of (A) at least one epoxy-based resin prepared from a diglycidyl ether of a polyether polyol having an average epoxide equivalent weight of from about 350 to about 5,000; or (B) at least one epoxy-based cationic resin prepared from a diglycidyl ether of a polyether polyol having an average epoxide equivalent weight of from about 350 to about 5,000 which diglycidyl ether has been partially capped with a monofunctional capping agent; or (C) a combination of (A) and (B); and (II) at least one different epoxy-based resin; wherein at some time during preparation of the composition, the resins are converted to cationic resins whereby there is obtained a blend of a cationic polyether epoxy-based resin and a different cationic epoxy-based resin; said blend comprising from about 10 to about 90 percent by weight based on total cationic resin and wherein the blend of cationic resins has a charge density of from about 0.2 to about 0.6 milliequivalent of charge per gram of resin.

21 Claims, No Drawings

CONTROLLED FILM BUILD EPOXY COATINGS APPLIED BY CATHODIC ELECTRODEPOSITION

CROSS-REFERENCE TO RELATED APPLICATION

This application is a continuation-in-part of copending application Ser. No. 911,281 filed September 24, 1986, now abandoned.

FIELD OF THE INVENTION

The invention is concerned with the preparation of coating compositions from epoxy-based resins and their application by cathodic electrodeposition.

BACKGROUND OF THE INVENTION

Electrodeposition has become an important method for the application of coatings over the last two decades and continues to grow in popularity because of its efficiency, uniformity and environmental acceptance. Cathodic electrodeposition has become dominant in areas where highly corrosion-resistant coatings are required, such as in primers for automobile bodies and parts. Epoxy based systems provide the best overall performance in this application and are widely used.

Cathodic electrodeposition resins based on conventional epoxies obtained by reacting liquid diglycidyl ethers of bisphenol A with bisphenol A to produce higher molecular weight epoxy resins have known disadvantages. Such products tend to have excessively high softening points resulting in poor flow out. In addition, such products require excessive amounts of solvent during their preparation. In order to improve flow, it has been proposed to modify such conventional epoxy resins by reaction with a diol in the presence of a tertiary amine catalyst. Thus, Bosso et al., U.S. Pat. No. 3,839,252, describes modification with polypropylene glycol. Marchetti et al., U.S. Pat. No. 3,947,339, teaches modification with polyesterdiols or polytetramethylene glycols. Wismer et al., U.S. Pat. No. 4,419,467, describes still another modification with diols derived from cyclic polyols reacted with ethylene oxide. These various modifications, however, also have disadvantages. Tertiary amines or strong bases are required to effect the reaction between the primary alcohols and the epoxy groups involved. Furthermore, these reactions require long reaction times and are subject to gellation because of competitive polymerization of the epoxy groups by the base catalyst. In addition epoxy resins containing low levels of chlorine are required to prevent deactivation of this catalyst.

Many coating formulations applied by electrodeposition include pigments to provide color, opacity, application, or film properties. U.S. Pat. No. 3,936,405, Sturni et al., describes pigment grinding vehicles especially useful in preparing stable, aqueous pigment dispersions for water-dispersible coating systems, particularly for application by electrodeposition. The final electrodepositable compositions, as described, contain the pigment dispersion and an ammonium or amine salt group solubilized cationic electrodepositable epoxy-containing vehicle resin and other ingredients typically used in electrodepositable compositions. Among the kinds of resins used are various polyepoxides such as polyglycidyl ethers of polyphenols, polyglycidyl ethers of polyhydric alcohols and polyepoxides having oxyalkylene groups in the epoxy molecule.

Moriarity et al., U.S. Pat. No. 4,432,850 discloses an aqueous dispersion of a blend of (A) an ungelled reaction product of a polyepoxide and a polyoxyalkylenepolyamine, which is then at least partially neutralized with acid to form cationic groups, and (B) an additional cationic resin different from (A). The resulting dispersion is applied by cathodic electrodeposition and is disclosed as providing high throw power and films which are better appearing, more flexible and more water-resistant.

Anderson et al. U.S. Pat. No. 4,575,523, discloses a film-forming resin composition which when combined with a crosslinking agent and solubilized, is capable of depositing high build coatings in cathodic electrodeposition processes. The resin is a reaction product of a modified epoxy formed by reacting a water-soluble or water-miscible polyol, an excess of polyamine, and an aliphatic monoepoxide.

The automobile industry still has needs in the areas of controlled film thickness. The ability to build thicker, uniform films which are smooth and free of defects will allow the elimination of an intermediate layer of paint known as a primer surface or spray primer, previously required to yield a sufficiently smooth surface for the topcoat. Such an elimination results in removal of one paint cycle and provides more efficient operations. Thicker electrocoat primers may also provide improved corrosion resistance.

SUMMARY OF THE INVENTION

The present invention pertains to an improvement in a process for the preparation of an epoxy cationic resin from an epoxy resin composition having terminal oxirane groups which includes the step of converting oxirane groups to cationic groups by reacting a nucleophile with at least some of the oxirane groups of the epoxy resin composition wherein an organic acid and water are added during some part of this conversion; wherein the improvement resides in using as the epoxy resin composition a blend of (I) at least one of (A) at least one epoxy-based resin which is diglycidyl ether of a polyether polyol having an average epoxide equivalent weight of from about 350 to about 5,000, preferably from about 600 to about 3,000, more preferably from about 1,200 to about 2,400, most preferably from about 1,600 to about 2,000; or (B) at least one epoxy-based resin which is a diglycidyl ether of a polyether polyol having an average epoxide equivalent weight of from about 350 to about 5,000 which diglycidyl ether has been partially capped with a monofunctional capping agent; or (C) a combination of (A) and (B); and (II) at least one different epoxy-based resin; wherein at some time during preparation of the composition, the resins are converted to cationic resins whereby there is obtained a blend of a cationic polyether epoxy-based resin and a different cationic epoxy-based resin; said blend comprising from about 10 to about 90, suitably from about 10 to about 60, more suitably from about 15 to about 50, most suitably from about 20 to about 30, percent by weight of component (I) and from 90 to about 10, suitably from about 60 to about 10, more suitably from about 50 to about 15, most suitably from about 30 to about 20, percent by weight based on total cationic resin and wherein the blend of cationic resins has a charge density of from about 0.2 to about 0.6 milliequivalent of charge per gram of resin.

Another aspect of the present invention pertains to the product resulting from the aforementioned process.

Another aspect of the present invention pertains to a coating composition suitable for electro-deposition comprising an aqueous dispersion of the product resulting from the aforementioned process in combination with a curing agent selected from a blocked polyisocyanate, an amine aldehyde resin or a phenol aldehyde resin.

A further aspect of the present invention pertains to a method of coating a cationic, epoxy resin-based composition onto an object having an electroconductive surface by the steps comprising (1) immersing the electroconductive object into a coating bath comprising an aqueous dispersion of cationic particles of the epoxy-based composition;

(2) passing an electric current through said bath sufficient to electrodeposit a coating of said composition onto the object by providing a difference in electrical potential between the object and an electrode that is (a) spaced apart from said object;
(b) in electrical contact with said bath; and
(c) electrically positive in relation to said object; the improvement which comprises using as the cationic resin composition, a composition comprising a blend of (I) at least one of
(A) at least one epoxy-based resin which is a diglycidyl ether of a polyether polyol having an average epoxide equivalent weight of from about 350 to about 5,000;
(B) at least one epoxy-based resin which is a diglycidyl ether of a polyether polyol having an average epoxide equivalent weight of from about 350 to about 5,000 which diglycidyl ether has been partially capped with a monofunctional capping agent; or
(C) a combination of (A) and (B); and (II) at least one different epoxy-based resin; wherein at some time during preparation of the composition, the resins are converted to cationic resins whereby there is obtained a blend of a cationic polyether epoxy-based resin and a different cationic epoxy-based resin; said blend comprising from about 10 to about 90 percent by weight of component (I) and from 10 to about 90 percent by weight of component (II) based on total cationic resin and wherein the blend of cationic resins has a charge density of from about 0.2 to about 0.6 milliequivalent of charge per gram of resin.

Unexpectedly, incorporation of resins containing the glycidyl ethers of polyetherpolyols into the blends confer to cathodically electrodepositable coating compositions produced therefrom the ability to build thicker films having controlled thickness during the electrodeposition process, as compared to a similar composition using an epoxy resin not containing the polyetherpolyol/glycidyl ether component. The ability to deposit thicker films is highly desirable for reducing the number of paint applications required while improving the corrosion resistance and appearance of the electrodeposited coating. The film thickness can be controlled by adjusting the amount of the diglycidylether of polyetherpolyol incorporated into the epoxy resin. Generally, thickness increases with increasing content of this component.

Another advantage is that the blends of cationic epoxy resins containing the diglycidylether of a polyetherpolyol have a lower viscosity at a given temperature than unmodified cationic resins of the same molecular weight. This lower viscosity allows the use of higher molecular weight resins and/or less solvent to achieve a viscosity comparable to an unmodified resin. The lower viscosity cationic resins allow the coating composition greater flowout during deposition and curing which results in better appearance. Alternatively, the lower viscosity cationic resins enable curing at lower temperatures to give equivalent flow and appearance. Finally, coatings produced using these epoxy resins have greater flexibility due to incorporation of the diglycidylether of a polyether polyol component as compared to those based on similar resins not containing that component.

All of the coating compositions of the invention provide useful cathodically electrodepositable coatings having improved flowout, film build, and flexibility properties due to the incorporation of the resin containing the diglycidyl ether of a polyetherpolyol as a component of the blend.

DETAILED DESCRIPTION OF THE INVENTION

The improvement of the present invention is provided by a blend of a selected epoxy cationic resin with a different epoxy-based cathodic electrodeposition resin.

The Epoxy Cationic Resin

The starting epoxy resin component for preparing the epoxy cationic resin required for the mixture of resins of this invention is a resin which can be produced by dehydrohalogenation of the condensation product of an epihalohydrin with a polyether glycol in the presence of a basic acting substance. Optionally the lower epoxy equivalent weight resins may be reacted with a monohydric cupping agent to obtain a desired epoxy equivalent weight.

The glycidyl ethers of polyetherpolyols which are useful herein include those represented by the following formula I:

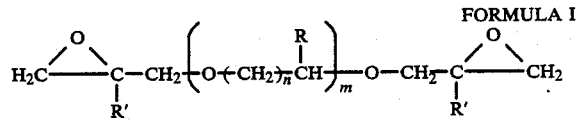

FORMULA I where R is hydrogen or an alkyl group having from about 1 to 6 carbon atoms; R' is hydrogen or an alkyl group having from 1 to about 4 carbon atoms; m has an average value of from 3 to about 225; and n has a value from 1 to 3.

The glycidyl ethers of polyetherpolyols are produced by the condensation of an epihalohydrin with a polyetherpolyol having the structure:

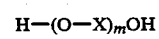

wherein X is $$-(CH_2)_n-\overset{\overset{R}{|}}{CH}-$$

where R, m and n are as defined above.

The polyetherpolyols can be produced by the polymerization of the appropriate alkylene oxide or of mixtures of various alkylene oxides to produce a chain having the desired R groups distributed among the units. Examples of useful polyetherpolyols are diethylene glycol, triethylene glycol, poly(ethylene glycol), dipropylene glycol, tripropylene glycol, poly(propylene glycol), di-1,2-butylene glycol, poly(1,2-butyleneoxide), poly(1,4-butanediol), and the like. The particularly preferred polyetherpolyols from which the diglycidyl ethers are derived is poly(propylene glycol) in which the average value of m is between about 40 and about 80. The suggested equivalent weight of the epoxy resin prepared from the polyetherglycols is from about 350 to about 5,000, preferably from about 600 to about 3,000, more preferably from about 1,200 to about 2,400 and most preferably from about 1,600 to about 2,000.

Some of the common methods of synthesis of the diglycidelethers of polyetherpolyols produce significant amounts of organic chloride-containing impurities. However, other processes are known for preparing products with lower levels of such impurities. While the low-chloride resins are not required for the practice of this invention, they may be used, if desired, for possible improvements in the process of preparing the resins, in the storage properties of the resins or formulated coatings made therefrom or in the performance properties of the products.

The use of capping agents such as monofunctional phenolic compounds provides the advantageous ability to reduce the epoxide content of the resulting product without chain-extension reactions and thus allows independent control of the average molecular weight and the epoxide content of the resulting resin within certain limits. Use of a monofunctional compound to terminate a certain portion of the resin chain ends also reduces the average epoxy functionality of the reaction product. The monofunctional phenolic compound is typically used at levels of from zero to about 0.7 equivalent of phenolic hydroxyl groups per equivalent of epoxy.

Examples of useful monofunctional capping agents are monofunctional phenolic compounds such as phenol, tertiary-butyl phenol, cresol, para-nonyl phenol, higher alkyl substituted phenols, and the like. Particularly preferred is para-nonyl phenol. The number of phenolic groups are chosen so that there will be a stoichiometric excess of epoxide groups. Ratios are chosen so that the resulting product will contain the desired concentration of terminal epoxy groups and the desired concentration of resin chain ends terminated by the monophenolic compound after substantially all of the phenolic groups are consumed by reaction with epoxy groups. Usually, the amount of the capping agent is from about 1 percent to about 15 percent based on the total weight of the components.

These amounts are dependent on the respective equivalent weights of the reactants and the relative amounts of the epoxy-functional components and may be calculated by methods known in the art. In the practice of this invention, the desired epoxide content of the reaction product useful for preparation of the cationic resin is typically between 1 and 5 percent, calculated as the weight percentage of oxirane groups, and preferably is from about 2 to about 4 percent. These levels are preferred because they provide, after conversion, the desired cationic charge density in the resinous products useful in cathodic electrodeposition. These cationic resins are produced by conversion of part or all of the epoxy groups to cationic groups as described below.

Reactions of the monofunctional capping agent to produce the epoxy resins are typically conducted by mixing the components and heating, usually in the presence of a suitable catalyst, to temperatures between about 130° C. and about 225° C., preferably between about 150° C., and about 200° C., until the desired epoxide content of the product is reached. The reaction optionally may be conducted in an appropriate solvent to reduce the viscosity, facilitate mixing and handling, and assist in controlling the heat of reaction.

Many useful catalysts for the desired reactioins are known in the art. Examples of suitable catalysts include ethyltriphenylphosphonium phosphonium acetate•acetic acid complex, ethyltriphenylphosphonium chloride, bromide, iodide, or phosphate, and tetrabutylphosphonium acetate•acetic acid complex. The catalysts are typically used at levels of 0.01 to 0.5 mole percent of the epoxide groups.

Appropriate solvents include aromatic solvents, glycol ethers, glycol ether esters, high boiling esters or ketones, or mixtures. Other useful solvents will be apparant to those skilled in the art. Preferred solvents are ethylene glycol monobutylether and propylene glycol monophenylether. Solvent content may range from zero to about 30 percent of the reaction mixture. A solvent is usually chosen which is compatible with the subsequent cation-forming reactions and with the final coating composition so that the solvent does not require subsequent removal.

The nucleophilic compounds which are used advantageously in forming the cations required by this invention are represented by the following classes of compounds, sometimes called Lewis bases:

(a) monobasic heteroaromatic nitrogen compounds;
(b) tetra (lower alkyl)thioureas;
(c) sulfur compound having the formula $R^1-S-R^2$ wherein $R^1$ and $R^2$ individually are lower alkyl, hydroxy lower alkyl or wherein $R^1$ and $R^2$ are combined as one alkylene radical
(d) tertiary amines represented by the formula $$R^1-\overset{\overset{R^3}{|}}{N}-R^2$$

wherein $R^2$ and $R^3$ individually are lower alkyl, hydroxy lower alkyl, $$-R^4-N=C\overset{\nearrow R^5}{\searrow_{R^6}}$$

or are combined as one alkylene radical having from 3 to 5 carbon atoms, $R^4$ is an alkylene group having from 2 to 10 carbon atoms, $R^5$ and $R^6$ individually are lower aralkyl or aryl, except that when $R^2$ and $R^3$ together are an alkylene group then $R^1$ is hydrogen, lower alkyl or hydroxyalkyl and when either or both of $R^2$ and $R^3$ is

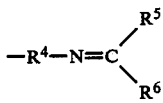

then $R^1$ is hydrogen, (e) a phosphorus compound represented by the formula

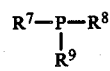

wherein $R^7$, $R^8$ and $R^9$ individually are lower alkyl, hydroxy lower alkyl or aryl.

In this specification the term lower alkyl means an alkyl having from 1 to about 6 carbon atoms such as methyl, ethyl, propyl, isopropyl, n-butyl, isobutyl, n-pentyl, isopentyl, n-hexyl and isohexyl.

Representative specific nucleophilic compounds are pyridine, nicotinamide, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, dimethyl amine, diethyl amine, dibutyl amine, N-methylethanolamine, diethanolamine and the ketimine derivatives of polyamines containing secondary and primary amino groups such as those produced by the reaction of diethylene triamine or N-aminoethylpiperazine with acetone, methyl ethyl ketone or methylisobutyl ketone; N-methylpiperidine, N-ethylpyrrolidine, N-hydroxyethylpyrrolidine, trimethylphosphine, triethylphosphine, tri-n-butylphosphine, trimethylamine, triethyl- amine, tri-n-propylamine, triisobutylamine, hydroxyethyldimethylamine, butyldimethylamine, trihydroxyethylamine, triphenylphosphorus, and N,N,N-dimethylphenethylamine.

Substantially any organic acid, especially a carboxylic acid, can be used in the conversion reaction to form onium salts so long as the acid is sufficiently strong to promote the reaction between the nucleophile and the vicinal epoxide group(s) on the resinous reactant. In the case of the salts formed by addition of acid to a secondary amine/epoxy resin reaction product, the acid should be sufficiently strong to protonate the resultant tertiary amine product to the extent desired.

Monobasic acids are normally preferred ($H \oplus A \ominus$). Suitable organic acids include, for example, alkanoic acids having from 1 to 4 carbon atoms (e.g., acetic acid, propionic acid, etc.), alkenoic acids having up to 5 carbon atoms (e.g., acrylic acid, methacrylic acid, etc.) hydroxy-functional carboxylic acids (e.g., glycolic acid, lactic acid, etc.) and organic sulfonic acids (e.g., methanesulfonic acid), and the like. Presently preferred acids are lower alkanoic acids of 1 to 4 carbon atoms with lactic acid and acetic acid being most preferred. The anion can be exchanged, of course, by conventional anion exchange techniques. See, for example, U.S. Pat. No. 3,959,106 at column 19. Suitable anions are chloride, bromide, bisulfate, bicarbonate, nitrate, dihydrogen phosphate, lactate and alkanoates of 1-4 carbon atoms. Acetate and lactate are the most preferred anions.

The conversion reaction to cationic resins is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates occur at temperatures of from about 25° C. to about 100° C., with preferred reaction rates being observed at temperatures from about 60° C. to about 80° C.

Good results can be achieved by using substantially stoichiometric amounts of reactants although a slight excess or deficiency of the epoxy-containing resin or the nucleophile can be used. With weak acids, useful ratios of the reactants range from 0.5 to 1.0 equivalent of nucleophile per epoxide group of the resin and 0.6 to 1.1 equivalents of acid per epoxide. These ratios, when combined with the preferred epoxide content resins described above, provide the desired range of cationic charge density required to produce a stable dispersion of the coating composition in water. With still weaker acids (e.g., a carboxylic acid, such as acetic acid) a slight excess of acid is preferred to maximize the yield of onium salts. In preparing the compositions in which the cationic group being formed is an onium group, the acid should be present during the reaction of the nucleophile and the epoxy group of the resin. When the nucleophile is a secondary amine, the amine-epoxy reaction can be conducted first, followed by addition of the acid to form the salt and thus produce the cationic form of the resin.

For the onium-forming reactions, the amount of water that is also included in the reaction mixture can be varied to convenience so long as there is sufficient acid and water present to stabilize the cationic salt formed during the course of the reaction. Normally, it has been found preferable to include water in the reaction in amounts of from about 5 to about 30 moles per epoxy equivalent. When the nucleophile is a secondary amine, the water can be added before, during, or after the resin epoxy group/nucleophile reaction. The preferred range of charge density of the cationic, advanced epoxy resin is from about 0.2 to about 0.6 milliequivalent of charge per gram of the resin. The change density can be determined by the method taught by Wismer et al. in U.S. Pat. No. 4,191,674 which is incorporated herein by reference.

It has also been found advantageous to include minor amounts of water-compatible organic solvents in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included. One class of solvents that we have found particularly beneficial are the monoalkyl ethers of the $C_2$–$C_4$ alkylene glycols. This class of compounds includes, for example, the monomethyl ether of ethylene glycol, the monobutyl ether of ethylene glycol, etc. A variety of these alkyl ethers of alkylene glycols are commercially available.

When a desired degree of reaction is reached, any excess nucleophile can be removed by standard methods, e.g., dialysis, vacuum stripping and steam distillation.

The Other Resin

The other resin which is blended with the epoxy cationic resin containing the glycidyl ether of a polyetherpolyol component is broadly characterized as a different cathodically electrodepositable resin. Preferred kinds of the different electrodepositable resins are epoxy-based resins, particularly those resins containing a reacted glycidyl ether of a dihydric phenol which has been advanced with a dihydric phenol such as bisphenol A. Conventional epoxy resins obtained by reacting liquid diglycidyl ethers of bisphenol A with bisphenol A are among the more specific examples of the class of other resins which can be a portion of the blend.

Useful glycidyl ethers of polyphenols are represented by the following Formulae II and III:

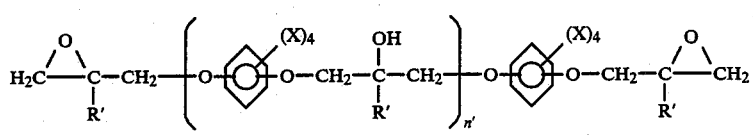

FORMULA II

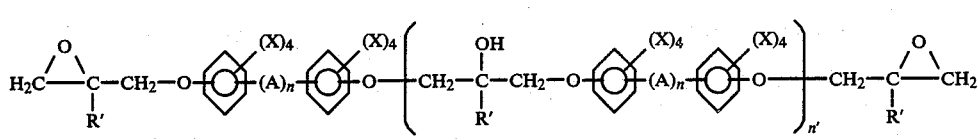

FORMULA III wherein A is a divalent hydrocarbon group having from 1 to about 12, preferably from 1 to about 6, carbon atoms; —S—, —S—S—, —SO—, —SO$_2$—, —CO—, —O— or the like; each X is independently hydrogen, a hydrocarbyl or hydrocarbyloxy group having from 1 to 4 carbon atoms, or a halogen, preferably chlorine or bromine; each R' is independently hydrogen or a hydrocarbyl group having from 1 to 3 carbon atoms; n has a value of zero or 1; and n' has an average value from zero to about 40, preferably from about 0.1 to about 5.

The term hydrocarbyl as employed herein includes, alkyl, cycloalkyl, aryl, aralkyl, alkaryl, alkenyl and the like. Likewise, the term hydrocarbyloxy as employed herein includes, alkyloxy, cycloalkyloxy, aryloxy, aralkyloxy, alkaryloxy, alkenyloxy and the like.

Polyphenols useful for the production of these polyepoxides include 2,2-bis(4-hydroxyphenyl)- propane (bisphenol A), 1,1-bis(4-hydroxyphenyl)ethane, bis(4-hydroxyphenyl)methane (bisphenol F), p,p'-hydroxybiphenol, resorcinol, hydroquinone, or the like. The particularly preferred polyglycidyl ethers of polyphenols are the diglycidyl ether of bisphenol A and the oligomeric polyglycidyl ethers of bisphenol A.

Several kinds of epoxy-based resins which can be used in the blends are described in various patents as follows: Jerabek in U.S. Pat. No. 4,031,050 describes cationic electrodeposition resins which are the reaction of epoxy-based cationic resins which are the reaction products of an epoxy-based resin and primary or secondary amines. U.S. Pat. No. 4,017,438 to Jerabek et al. describes reaction products of epoxy-based resins and blocked primary amines. Bosso et al. describe in U.S. Pat. Nos. 3,962,165; 3,975,346; 4,001,101 and 4,101,486 cationic electrodeposition resins which are reaction products of an epoxy-based resin and tertiary amines. Bosso et al. in U.S. Pat. No. 3,959,106 and DeBona in U.S. Pat. No. 3,793,278 describe cationic electrodeposition resins which are epoxy-based resins having sulfonium salt groups. Wessling et al. in U.S. Pat. No. 4,383,073 describes cationic electrodeposition resins which are epoxy-based resins having carbamoylpyridinium salt groups. U.S. Pat. No. 4,419,467 to Bosso et al. discusses epoxy-based resins reacted with primary, secondary and tertiary amine groups as well as quaternary ammonium groups and ternary sulfonium groups. U.S. Pat. No. 4,076,676 to Sommerfeld describes aqueous dispersions of epoxy-based cationic resins which are the reaction products of a terminally functional epoxy resin, a tertiary amine and a nitrogen resin. U.S. Pat. No. 4,134,864, to Belanger, describes reaction products of epoxy-based resins, polyamines and a capping agent. Still other suitable resins for use in the blends of this invention are described in the patents in the following list:

| U.S. Pat. Nos. | Patentee |
|---|---|
| 4,182,831 | Hicks |
| 4,190,564 | Tominaga et al. |
| 4,296,010 | Tominaga |
| 4,335,028 | Ting et al. |
| 4,339,369 | Hicks et al. |

All of the aforementioned U.S. Patents are incorporated herein by reference.

Also suitable as the other epoxy-based resin in the present invention are any of the aforementioned epoxy resins which have been partially capped with the aforementioned capping agents. The amount of the capping agent is from about zero to about 0.7 equivalent per epoxide equivalent.

Preparing the Blends

The blends of the critical resin, glycidyl ether of a polyetherpolyol and the other resin can be prepared in any one of several ways.

The preparation of the desired product in an aqueous dispersion can involve the following steps:
1. preparing the non-cationic resin,
2. converting the non-cationic resin to a cationic resin,
3. converting the cationic resin to a water-in-oil dispersion of the resin, and
4. converting the water-in-oil dispersion to an oil-in-water dispersion.

The blending of the critical resin and the other resin can occur with the resins at the same stage after step 1, after step 2, after step 3 or after step 4. Thus resins of the two types may be blended (a) as non-cationic resins, (b) as cationic resins (c) as water-in-oil dispersions of the cationic resins or (d) as oil-in-water dispersions. Subsequent steps are then carried out on the blended material (except for (d)), to form the desired product as an aqueous dispersion. These aqueous dispersions may be treated further as desired according to the discussion below in other embodiments of this invention.

The blending of the resins generally involves only gentle mixing. When blending is done with the non-cationic resins or with the cationic resins which are not yet in aqueous dispersion, a solvent for the resins optionally may be used to facilitate the mixing.

The relative amounts of the critical resin and the other resin in the blend are such as to provide from about 10 percent to about 90 percent of the critical resin, based on the total weight of cationic resin in the blend.

Other Embodiments of the Invention

The blends of resins of this invention in the form of aqueous dispersions are useful as coating compositions, especially when applied by electrodeposition. The coating compositions containing the blends of this invention as the sole resinous component are useful but it is preferred to include crosslinking agents in the coating composition to facilitate curing so that the coated films will be crosslinked and exhibit improved film properties. The most useful sites on the resin for crosslinking reactions are the secondary hydroxyl groups along the resin backbone. Materials suitable for use as crosslinking agents ae those known to react with hydroxyl groups and include blocked polyisocyanates; amine-aldehyde resins such as melamine-formaldehyde, urea-formaldehyde, benzoguanine-formaldehyde, and their alkylated analogs; and phenol-aldehyde resins.

Particularly useful and preferred crosslinking agents are the blocked polyisocyanates which, at elevated temperatures, deblock and form isocyanate groups which react with the hydroxyl groups of the resin to crosslink the coating. Such crosslinkers are typically prepared by reaction of the polyisocyanate with a monofunctional active-hydrogen compound.

Examples of polyisocyanates suitable for preparation of the crosslinking agent are described in U.S. Pat. No. 3,959,106 to Bosso, et al., in Column 15, lines 1-24, incorporated by reference herein. Also suitable are isocyanate-functional prepolymers derived from polyisocyanates and polyols using excess isocyanate groups. Examples of suitable prepolymers are described by Bosso, et al., in U.S. Pat. No. 3,959,106, Column 15, lines 25-57, incorporated herein by reference. In the preparation of the prepolymers, reactant functionality, equivalent ratios, and methods of contacting the reactants must be chosen in accordance with considerations known in the art to provide ungelled products having the desired functionality and equivalent weight.

Examples of polyisocyanates are the isocyanurate trimer of hexamethylene diisocyanate, toluene diisocyanate, methylene diphenylene diisocyanate, isophorone diisocyanate, and a prepolymer from toluene diisocyanate and polypropylene glycol and a prepolymer of toluene diisocyanate and trimethylolpropane.

Suitable blocking agents include alcohols, phenol, oximes, lactams, and N,N-dialkylamides or esters of alpha-hydroxyl group containing carboxylic acids. Examples of suitable blocking agents are described in U.S. Pat. No. 3,959,106 to Bosso, et al., in Column 15, line 58, through Column 16, line 6, and in U.S. Pat. No. 4,452,930 to Moriarity. Particularly useful are the oximes of ketones, also known as ketoximes, due to their tendency to deblock at relatively lower temperatures and provide a coating composition which can be cured at significantly lower temperatures. The particularly preferred ketoxime is methyl ethyl ketoxime.

These cationic resins of the invention, when formulated with certain preferred ketoxime-blocked polyisocyanates, provide coating compositions which cure at significantly lower temperatures than those of the prior art.

The blocked polyisocyanates are prepared by reacting equivalent amounts of the isocyanate and the blocking agent in an inert atmosphere such as nitrogen at temperatures between about 25° C. and about 100° C., preferably below 70° C. to control the exothermic reaction. Sufficient blocking agent is used so that the product contains no residual, free isocyanate groups. A solvent compatible with the reactants, product, and the coating composition may be used such as a ketone or an ester. A catalyst may also be employed such as dibutyl tin dilaurate.

The blocked polyisocyanate crosslinking agents are incorporated into the coating composition at levels corresponding to from about 0.2 to about 2 blocked isocyanate groups per hydroxyl group of the cationic resin.

A catalyst optionally may be included in the coating composition to provide faster or more complete curing of the coating. Suitable catalysts for the various classes of crosslinking agents are known to those skilled in the art. For the coating compositions using the blocked polyisocyanates as crosslinking agents, suitable catalysts include dibutyl tin dilaurate, dibutyl tin diacetate, dibutyl tin oxide, stannous octanoate, and other urethane-forming catalysts known in the art. The preferred catalyst is dibutyl tin dilaurate. Amounts used typically range between about 0.1 and about 3 weight percent of binder solids.

Unpigmented coating compositions are prepared by mixing the cationic resin blend with the cross-linking agent and optionally any additives such as catalysts, solvents, surfactants, flow modifiers, defoamers, or other additives. This mixture is then dispersed in water by any of the known methods. A particularly preferred method is the technique known as phase-inversion emulsification, wherein water is slowly added with agitation to the above mixture, usually at temperatures ranging from ambient to 90° C., until the phases invert to form an organic phase-in-water dispersion. The solids content of the aqueous dispersion is usually between about 5 and about 30 percent by weight and preferably between about 10 and about 25 percent by weight for application by electrodeposition.

Pigmented coating compositions are prepared by adding a concentrated dispersion of pigments and extenders to the unpigmented coating compositions. This pigment dispersion is prepared by grinding the pigments together with a suitable pigment grinding vehicle in a suitable mill as known in the art.

Pigments and extenders known in the art are suitable for use in these coatings including pigments which increase the corrosion resistance of the coatings. Examples of useful pigments or extenders include titanium dioxide, talc, clay, lead oxide, lead silicates, lead chromates, carbon black, strontium chromate, and barium sulfate.

Pigments grinding vehicles are known in the art. A preferred pigment grinding vehicle for use in this invention consists of a water-soluble cationic resinous product, water, and a minor amount of glycol ether solvent.

The cationic resinous product is prepared by reacting an epichlorohydrin/bisphenol A condensation product having an epoxide group content of about 8 percent with a nucleophile, an acid, and water in a similar fashion as described above for the cationic resins used in the preferred embodiment of the invention. Alternatively the previously described glycidyl ethers of polyetherpolyols, having an epoxide group content of about 8 percent may be substituted for the bisphenol A type epoxy resin. The water-soluble product may be diluted with water to form a clear solution useful as a pigment grinding vehicle.

The pH and/or conductivity of the coating compositions may be adjusted to desired levels by the addition of compatible acids, bases, and/or electrolytes known in the art. Other additives such as solvents, surfactants, defoamers, anti-oxidants, bactericides, etc. may also be added to modify or optimize properties of the compositions or the coating in accordance with practices known to those skilled in the art.

Although the coating compositions of the invention may be applied by any conventional technique for aqueous coatings, they are particularly useful for application by cathodic electrodeposition, wherein the article to be coated is immersed in the coating composition and made the cathode, with a suitable anode in contact with the coating composition. When sufficient voltage is applied, a film of the coating deposits on the cathode and adheres. Voltage may range from 10 to 1,000 volts, typically 50 to 500. The film thickness achieved generally increases with increasing voltage. In the case of the coating compositions of the invention, thicker films are achieved by incorporation of the diglycidyl ether of a polyetherpolyol into the cationic resins of the invention. Also, control over the final thickness may be exercised by adjusting the amount of that component used. Current is allowed to flow for between a few seconds to several minutes, typically two minutes, over which time the current usually decreases. Any electrically conductive substrate may be coated in this fashion, especially metals such as steel and aluminum. Other aspects of the electrodeposition process, such as bath maintainence, are conventional. After deposition, the article is removed from the bath and typically rinsed with water to remove that coating composition which does not adhere.

The uncured coating film on the article is cured by heating at elevated temperatures, ranging from about 200° to about 400° F., for periods of about 1 to about 60 minutes.

EXAMPLE 1

A cationic electrodeposition resin was prepared as follows:

Into a suitable reactor was charged 300 grams of a polyether diepoxide which is the condensation product of P-2000 polyether glycol (commercially available from Dow Chemical Co.) and epichlorohydrin having an epoxide equivalent weight of 1140. The resin was heated to 60° C. and 19.7 grams of methylethanolamine was added. This was allowed to react for one hour.

To the reaction product at 60° C. was added 6 grams of dibutyl tin dilaurate catalyst and 191.1 grams of a polyurethane crosslinker prepared as follows: 47 grams of 2-ethylhexanol was added slowly to 144 grams of a 60% solution of toluene diisocyanate-trimethylol propane prepolymer in a methoxy propyl acetate solvent (Spenkel P49-A6-60 commercially available from Spencer Kellogg Company) to which had been added 0.1 gram of dibutyl tin dilaurate catalyst. The reaction was conducted in an agitated closed vessel under a dry nitrogen blanket with external temperature control to keep the reacting temperature under 60° C. After a few hours there was no detectable free isocyanate as determined by infrared spectrophotometric analysis.

While agitating continuously, a cationic dispersion was prepared by adding to the resulting mixture, at 60° C., 12.6 grams of glacial acetic acid in 50 g of water followed by the slow addition of 1900 grams of water. This dispersion can be used as an additive to conventional epoxy based cathodic electrodeposition primers. When combined with commercially available cathodic electrodeposition dispersion resins, coating of variable thicknesses are formed.

For example, the cationic dispersion described above was blended with a commercial cathodic electrodeposition primer, ED3002. ED3002, marketed by PPG Industries, Inc., is a commercial cathodic electrodeposition primer containing an epoxy-based advanced resin and is herein described as a conventional electrodeposition primer. Cationic electrodeposition baths were prepared by adding 0, 10, 20, 30, 40 and 50 weight percent of the above described dispersion to ED3002.

Steel panels pretreated with zinc phosphate were cationically electrocoated in the bath at 100, 150, 200 and 250 volts for 2 minutes (120 s) at a bath temperature of 27° C. The wet films were baked at 350° F. (176° C.) for 30 minutes (1800 s). Film thicknesses were measured and are reported in Table I.

TABLE I

| | SAMPLE DESIGNATION | | | | | |
|---|---|---|---|---|---|---|
| | A* | B | C | D | E | F |
| POLYETHER BASED EPOXIDE, wt. % | 0 | 10 | 20 | 30 | 40 | 50 |
| ED3002 EPOXIDE, wt. % | 100 | 90 | 80 | 70 | 60 | 50 |
| APPLICATION VOLTAGE & FILM THICKNESS | | | | | | |
| 100 V, inches | 0.00033 | 0.00034 | 0.00039 | 0.00041 | 0.00055 | 0.00077 |
| 100 V, mm | 0.00838 | 0.00864 | 0.00099 | 0.00104 | 0.00140 | 0.01956 |
| 150 V, inches | 0.00044 | 0.00044 | 0.00047 | 0.00067 | 0.00075 | 0.00105 |
| 150 V, mm | 0.00112 | 0.00112 | 0.01194 | 0.01702 | 0.01905 | 0.02667 |
| 200 V, inches | 0.00054 | 0.00055 | 0.00069 | 0.00082 | 0.00103 | 0.00142 |
| 200 V, mm | 0.01372 | 0.01397 | 0.01753 | 0.02083 | 0.02616 | 0.03607 |
| 250 V, inches | 0.00063 | 0.00068 | 0.00087 | 0.00113 | 0.00151 | 0.00291 |
| 250 V, mm | 0.01600 | 0.01727 | 0.02210 | 0.02870 | 0.03835 | 0.07391 |

*Not an example of the present invention.

This data shows that film thicknesses can be controlled by blending the proper proportion of the described cationic electrodeposition dispersion, based on polyether epoxide resin, with a commercial cathodic paint and applying it over a range of deposition voltages.

EXAMPLE 2

A cationic electrodeposition resin was prepared in the following manner. Into a suitable reactor was charged 75 grams of a polyether diepoxide which is the condenstion product of P-1000 polyether glycol (commercially available from The Dow Chemical Co.) and epichlorohydrin having an epoxide equivalent weight of 625. The resin was heated to 60° C. and 9 grams of methylethanolamine was added. This was allowed to react for one hour (3600 s) at 60° C.

To the reaction product at 60° C. was added 1.6 grams of dibutyl tin dilaurate catalyst and 44 grams of the polyurethane crosslinker described in Example. While agitating continuously, a cationic dispersion was prepared by adding to the resulting mixture, at 60° C., 7.2 grams of glacial acetic acid in 26 grams of water. An additional 490 grams of water was added slowly to produce a dispersion.

To 275 g of this dispersion was added 1563 grams of the commercially available ED3002 cathodic electrodeposition primer noted in Example 1. This blend was electrodeposited at 150, 200, and 250 volts as described in Example 1. The results obtained are given in Table II.

TABLE II

| Deposition Voltage | Film Thickness In./mm |
| --- | --- |
| 150 | 0.00060/0.01524 |
| 200 | 0.00093/0.02362 |
| 250 | 0.00206/0.05232 |

When compared to the data for the commercial cathodic electrodeposition paint in Example 1, this data shows that the addition of the polyether diepoxide based dispersion yields thicker coatings.

EXAMPLE 3

A cationic electrodeposition resin was prepared in the following manner. Into a 2-liter, round-bottomed flask fitted with a nitrogen inlet, thermometer, mechanical stirrer, and condenser were charged 1410 grams of an epoxy resin which was the condensation product of bisphenol A and epichlorohydrin having an epoxide equivalent weight of 187, 203.6 grams of nonyl phenol, and 590 grams of bisphenol A. The mixture was stirred in a nitrogen atmosphere and heated to 90° C. to form a clear mixture. A solution of 70 percent by weight of ethyltriphenylphosphonium acetate in methanol (5.0 grams) was added and the mixture heated to 150° C. and allowed to exotherm. Peak exotherm temperature was controlled to below 200° C., by cooling. The temperature was then maintained at 175° C. until about 60 minutes (3600 s) past peak exotherm when an epoxide equivalent weight of 1547 grams/equivalent was obtained.

This resin was cooled to 130° C. and 248 grams of propylene glycol phenyl ether solvent was added. The resin solution was further cooled to 75° C. and 106.7 grams of methylethanolamine was added and allowed to react for one hour (3600 s) at 75° C.

To 200 grams of reaction product at 60° C. was added 116 grams of the polyurethane crosslinker described in Example 1 and 5.0 grams of dibutyl tin dilaurate catalyst. While agitating continuously, a cationic dispersion was prepared by adding to the resulting mixture, at 60° C., 6.7 grams of glacial acetic acid in 50 grams of water. After blending well, an additional 1426 grams of water was added slowly to produce a dispersion.

A pigment grinding vehicle was prepared as follows:
Into a 2-liter, round-bottomed flask fitted with a nitrogen inlet, thermometer, mechanical stirrer, and condenser were charged 511.5 grams of epoxy resin which is a condensation product of bisphenol A and epichlorohydrin having an epoxide equivalent weight of 187 and 163.5 grams of bisphenol A. The mixture was stirrer in a nitrogen atmosphere and heated to 90° C. to form a clear mixture. A solution of 70 percent by weight of ethyltriphenylphosphonium acetate in methanol (0.89 grams) was added and the mixture heated to 150° C. and allowed to exotherm. Peak exotherm temperature was controlled to below 185° C. by cooling. The temperature was then maintained at 175° C. until about 75 minutes (4500 s) past peak exotherm when an epoxide equivalent weight of 526 grams/equivalent was obtained.

To the above resin was added 75 grams of ethylene glycol butyl ether solvent at a temperature between 110° C. to 130° C. the resin solution was cooled to 80° C. and an aqueous mixture consisting of 85.7 grams of N,N-dimethylethanolamine, 154.6 grams of an aqueous solution containing 88% of lactic acid and 288.9 grams deionized water was added over a period of 30 minutes to produce an opaque, whitish, viscous mixture. A reaction temperature of 80° C. was maintained for 4 hours (14,400 s). This mixture was heated to 70° C. for 10.5 hours (37,800 s) longer to obtain a complete reaction. The product was diluted to 30 percent solids by the dropwise addition of deionized water at 60° C.

The pigment paste was prepared by blending 525 grams of pigment grinding vehicle (40% solid), 105 grams of carbon black, 210 grams of basic silicate white lead, 367.5 grams of titanium dioxide, 367.5 grams of ASP 200 clay, and 131.3 grams of deionized water. These materials were mixed together by using a paint shaker. The pigment-to-vehicle ratio of the pigment paste was 5:1.

Cathodic electrodeposition paints were prepared by blending 6.3 grams of this pigment paste per 100 grams of the cationic electrodeposition resin dispersion described above and the one based on a polyether diepoxide described in Example 1. These were electrodeposited, as described in Example 1, separately and when blended together. The results obtained are given in Table III.

TABLE III

| | SAMPLE DESIGNATION | | | | |
| --- | --- | --- | --- | --- | --- |
| | A* | B | C | D | E |
| POLYETHER BASED EPOXIDE, wt. % | 0 | 10 | 20 | 30 | 100 |
| BISPHENOL A BASED EPOXIDE, wt. % | 100 | 90 | 80 | 70 | 0 |
| APPLICATION VOLTAGE & FILM THICKNESS | | | | | |
| 50 V, inches | — | — | — | — | 0.00111 |
| 50 V, mm | — | — | — | — | 0.02819 |
| 100 V, inches | 0.00015 | 0.00035 | 0.00063 | 0.00092 | 0.00273 |

TABLE III-continued

| | SAMPLE DESIGNATION | | | | |
|---|---|---|---|---|---|
| | A* | B | C | D | E |
| 100 V, mm | 0.00381 | 0.00889 | 0.01600 | 0.02337 | 0.06934 |
| 150 V, inches | 0.00019 | 0.00038 | 0.00069 | 0.00112 | — |
| 150 V, mm | 0.00483 | 0.00965 | 0.01753 | 0.02845 | — |
| 200 V, inches | 0.00026 | 0.00039 | 0.00072 | 0.00116 | — |
| 200 V, mm | 0.00660 | 0.00991 | 0.01828 | 0.02946 | — |
| 250 V, inches | 0.00031 | 0.00041 | 0.00074 | 0.00126 | — |
| 250 V, mm | 0.00787 | 0.01041 | 0.01879 | 0.03200 | — |

*Not an example of the present invention.

Coatings could not be applied above 125 volts from the 100 percent polyether diepoxide based dispersion due to the film rupturing which results from excessive gas evolution from the substrate during electrodeposition.

This data shows coatings obtained from a cationic electrodeposition paint prepared from a polyether diepoxide resin and a paint composed of blends of this paint with a bisphenol A type epoxide based cationic electrodeposition paint produce thicker coatings than those obtained from the bisphenol A type epoxide base cationic electrodeposition paint alone.

EXAMPLE 4

A cationic electrodeposition coating dispersion was prepared from a blend composed of 60 grams of the polyether diepoxide amine resin from Example 1 and 175 grams of the bisphenol A epoxide amine resin from Example 2. To this blend at 70° C. was added 140 grams of the polyurethane crosslinker described in Example 1 and 5 grams of dibutyl tin dilaurate catalyst. After mixing, 8.6 grams of glacial acetic acid in 52.6 grams of water was added. An additional 1340 grams of water was added slowly while stirring at 60° C. After cooling this dispersion was pigmented with 105 grams of the pigment paste described in Example 3. This was electrodeposited as delineated in Example 1. The data in Table IV shows that thicker coatings are obtained from this coating formulation, derived from blends of the amine resins, when compared to the thicknesses obtained from the formulation in Example 3 that does not contain the polyether diepoxide based resin:

TABLE IV

| Deposition Voltage | Film Thickness In./mm |
|---|---|
| 100 | 0.00017/0.00432 |
| 150 | 0.00042/0.01321 |
| 200 | 0.00075/0.01905 |
| 250 | 0.00171/0.04343 |

EXAMPLE 5

Example 4 was duplicated using the polyether diepoxide amine resin from Example 2 instead of the one from Example 1. The data in Table V shows similar results with thicker coatings produced:

TABLE V

| Deposition Voltage | Film Thickness In./mm |
|---|---|
| 150 | 0.00130/0.03302 |
| 200 | 0.00181/0.04597 |
| 250 | 0.00375/0.09525 |

What is claimed is:

1. In a process for preparation of an epoxy cationic resin from an epoxy resin composition having terminal oxirane groups which includes the step of converting oxirane groups to cationic groups by reacting a nucleophile with at least some of the oxirane groups of the epoxy resin composition wherein an organic acid and water are added during some part of this conversion, the improvement of using as the epoxy resin composition a blend of
   (I) at least one of
      (A) at least one epoxy-based resin which is a diglycidyl ether of a polyether weight of from about 350 to about 5,000; or
      (B) at least one epoxy-based resin which is a diglycidyl ether of a polyether polyol having an average epoxide equivalent weight of from about 350 to about 5,000 which diglycidyl ether has been partially capped with a monofunctional capping agent; or
      (C) a combination of (A) and (B); and
   (II) at least one different epoxy-based resin; wherein at some time during preparation of the composition, the resins are converted to cationic resins whereby there is obtained a blend of a cationic polyether epoxy-based resin and a different cationic epoxy-based resin; said blend comprising from about 10 to about 90 percent by weight of component (I) and from 90 to about 10 percent by weight of component (II) based on total cationic resin and wherein the blend of cationic resins has a charge density of from about 0.2 to about 0.6 milliequivalent of charge per gram of resin.

2. The process of claim 1 in which the amount of component (I) is from about 10 to about 60 percent by weight; the equivalent weight of said diglycidyl ether of a polyether polyol is from about 600 to about 3,000; and said capping agent is a monofunctional phenol.

3. The process of claim 2 in which the amount of component (I) is from about 15 to about 50 percent by weight; the equivalent weight of said diglycidyl ether of a polyether polyol is from about 1,600 to about 2,000; and said capping agent is a monofunctional phenol.

4. The process of claim 3 in which the amount of component (I) is from about 20 to about 30 percent by weight; the equivalent weight of said diglycidyl ether of a polyether polyol is from about 1,200 to about 2,400; and the amount of capping agent is from about zero to about 0.7 equivalent per epoxide equivalent.

5. The process of claim 1, 2, 3, or 4 in which the converting of the resins to cationic resins occurs after the different epoxy resins are blended.

6. The process of claim 1, 2, 3, or 4 in which the resins are blended after each resin has been converted to a cationic resin.

7. The process of claim 1, 2, 3, or 4 in which the resins are in the form of stable aqueous oil-in-water dispersions when the blending is carried out.

8. The process of claim 1, 2, 3, or 4 in which the diglycidyl ether of a polyether polyol is represented by the following formula I

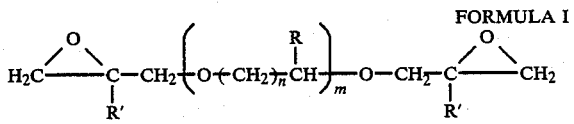

FORMULA I wherein R is hydrogen or an alkyl group having from 1 to about 6 carbon atoms; R' is hydrogen or an alkyl group having from 1 to about 4 carbon atoms; m is a number having an average of from 3 to about 225 and n is a number from 1 to about 3; and wherein said different epoxy-based resin is a diglycidyl ether of a polyhydric phenol represented by the following formulas II or III

FORMULA II

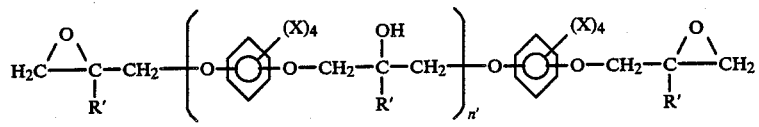

FORMULA III

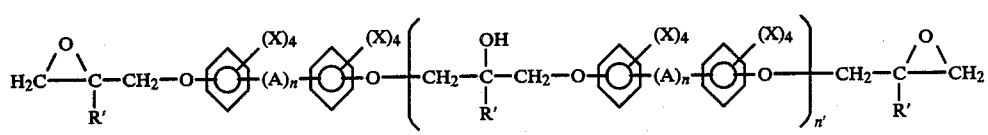

wherein each A is independently a divalent hydrocarbon group having from 1 to about 12 carbon atoms; —O—, —S—, —S—S—, —SO—, —SO$_2$—, —CO—; each R' is independently hydrogen or an alkyl group having from 1 to about 3 carbon atoms; each X is independently hydrogen, a hydrocarbyl or hydrocarbyloxy group having from 1 to about 4 carbon atoms or a halogen; n has a value of zero or 1 and n' has a value from 0 to about 40.

9. The process of claim 8 wherein said different epoxy resin is a resin represented by formula II or a partially capped epoxy resin represented by formula II wherein A is a divalent hydrocarbyl group having from 1 to about 6 carbon atoms; each R is independently hydrogen or bromine; each R' is hydrogen; n has a value of 1 and n' has a value from 0.1 to about 5; and the amount of capping agent is from zero to about 0.7 equivalents per epoxide equivalent.

10. In a method of coating a cationic, epoxy resin-based composition onto an object having an electroconductive surface by the steps comprising
 (1) immersing the electroconductive object into a coating bath comprising an aqueous dispersion of cationic particles of the epoxy-based composition;
 (2) passing an electric current through said bath sufficient to electrodeposit a coating of said composition onto the object by providing a difference in electrical potential between the object and an electrode that is
  (a) spaced apart from said object;
  (b) in electrical contact with said bath; and
  (c) electrically positive in relation to said object;
 the improvement which comprises using as the cationic resin composition, a composition comprising a blend of
 (I) at least one of
  (A) at least one epoxy-based resin which is a diglycidyl ether of a polyether polyol having an average epoxide equivalent weight of from about 350 to about 5,000; or
  (B) at least one epoxy-based resin which is a diglycidyl ether of a polyether polyol having an average epoxide equivalent weight of from about 350 to about 5,000 which diglycidyl ether has been partially capped with a monofunctional capping agent; or
  (C) a combination of (A) and (B); and
 (II) at least one different epoxy-based resin; wherein at some time during preparation of the composition, the resins are converted to cationic resins whereby there is obtained a blend of a cationic polyether epoxy-based resin and a different cationic epoxy-based resin; said blend comprising from about 10 to about 90 percent by weight of component (I) and from 90 to about 10 percent by weight of component (II) based on total cationic resin and wherein the blend of cationic resins has a charge density of from about 0.2 to about 0.6 milliequivalent of charge per gram of resin.

11. The method of claim 10 in which the amount of component (I) is from about 10 to about 60 percent by weight; the equivalent weight of said diglycidyl ether of a polyether polyol is from about 600 to about 3,000; the amount of said capping agent is from zero to about 0.7 equivalent per epoxide equivalent; and the coating bath also contains a during agent.

12. The method of claim 11 in which the amount of component (I) is from about 15 to about 50 percent by weight; the equivalent weight of said diglycidyl ether of a polyether polyol is from about 1,200 to about 2,400; the capping agent is a monofunctional phenol; and the curing agent is selected from a blocked polyisocyanate, an amine aldehyde resin and a phenol aldehyde resin.

13. The method of claim 12 in which the amount of component (I) is from about 20 to about 30 percent by weight; the equivalent weight of said diglycidyl ether of a polyether polyol is from about 1,600 to about 2,000; the capping agent is a monofunctional phenol; and the curing agent is selected from a blocked polyisocyanate, an amine aldehyde resin and a phenol aldehyde resin.

14. The method of claim 13 in which the curing agent is a ketoxime-blocked polyisocyanate.

15. The method of claims 10, 11, 12, 13, or 14 in which the coating bath also contains a pigment.

16. The method of claims 10, 11, 12, 13, or 14 in which the diglycidyl ether of a polyether polyol is represented by the following formula I

FORMULA I

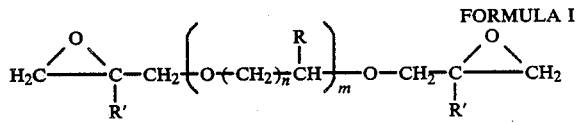

wherein R is hydrogen or an alkyl group having from 1 to about 6 carbon atoms; each R' is independently hydrogen or an alkyl group having from 1 to about 4 carbon atoms; n is a number from 1 to about 3 ; m has an average value of from 3 to about 225; and wherein said different epoxy-based resin is a diglycidyl ether of a polyhydric phenol represented by the following formulas II or III or a partially capped diglycidyl ether of such polyhydric phenol

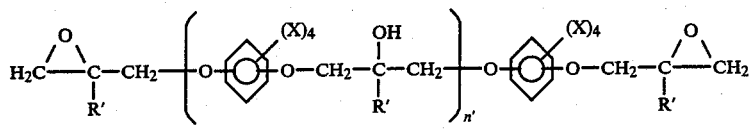
FORMULA I

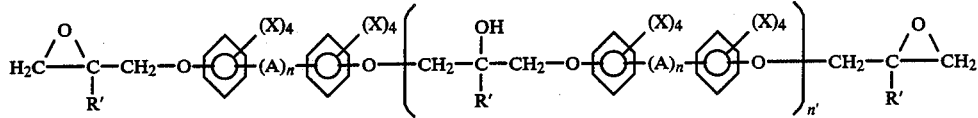
FORMULA II wherein each A is independently a divalent hydrocarbon group having from 1 to about 12 carbon atoms, —O—, —S—, —S—S—, —SO—,13 SO₂—, or 'CO—; each R' is independently hydrogen or an alkyl group having from 1 to about 3 carbon atoms; each X is independently hydrogen, a hydrocarbyl or hydrocarbyloxy group having from 1 to about 4 carbon atoms or a halogen; n has a value of zero or 1; and n' has a value from 0 to about 40; and the amount of capping agent is from zero to about 0.7 equivalent per epoxide equivalent.

17. The method of claim 16 wherein said different epoxy resin is a resin represented by formula II wherein A is a divalent hydrocarbyl group having from 1 to about 6 carbon atoms; each R is independently hydrogen or bromine; each R' is hydrogen; n has a value of 1 and n' has a value from 0.1 to about 5.

18. The product resulting from the process of claims 1, 2, 3, or 4.

19. A coating composition suitable for electrodeposition comprising an aqueous dispersion of the product of claim 18 in combination with a curing agent selected from a blocked polyisocyanate, an amine aldehyde resin or a phenol aldehyde resin.

20. A coating composition of claim 19 in which the curing agent is a ketoxime-blocked polyisocyanate.

21. The coating composition of claim 20 which also contains a pigment.

* * * * *

UNITED STATES PATENT AND TRADEMARK OFFICE
CERTIFICATE OF CORRECTION

PATENT NO.  : 4,867,854
DATED       : September 19, 1989
INVENTOR(S) : John M. McIntyre It is certified that error appears in the above-identified patent and that said Letters Patent is hereby corrected as shown below:

Column 2, line 42; change "is diglycidyl" to read --is a diglycidyl--.

Column 6, line 19; change "reactioins" to read --reactions--.

Column 6, line 65 and 66; change " are lower aralkyl" to read --are lower alkyl and $R^1$ is hydrogen or lower alkyl, aralkyl--.

Column 8, line 52; change "reaction. mixture." to read --reaction mixture.--.

Column 11, line 28; change "agents ae" to read --agents are--.

Column 14, line 33; change "coating of" to read --coatings of--.

Column 15, line 20; change "in Example." to read --in Example I.

*Column 16, line 15; change "was stirrer in" to read --was stirred in--.

Column 18, line 10; change "polyether weight" to read --polyether polyol having an average epoxide equivalent weight--.

Column 20, line 33; change "a during agent." to read --a curing agent.--.

Column 21, line 18; change "13 $SO_2$-" to read -- -$SO_2$- --.

Signed and Sealed this

Nineteenth Day of November, 1991

Attest:

HARRY F. MANBECK, JR.

*Attesting Officer*     *Commissioner of Patents and Trademarks*